(12) United States Patent
Reichardt

(10) Patent No.: US 6,457,641 B1
(45) Date of Patent: Oct. 1, 2002

(54) UNIVERSAL SWITCH FOR SMART CARD READER

(75) Inventor: Manfred Reichardt, Weinsberg (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/623,260

(22) PCT Filed: Dec. 31, 1999

(86) PCT No.: PCT/EP99/10484

§ 371 (c)(1),
(2), (4) Date: Aug. 31, 2000

(87) PCT Pub. No.: WO00/41126

PCT Pub. Date: Jul. 13, 2000

(30) Foreign Application Priority Data

Dec. 31, 1998 (DE) .......................................... 198 60 882
Dec. 28, 1999 (DE) .......................................... 198 63 448

(51) Int. Cl.[7] ................................................. G06K 7/06
(52) U.S. Cl. ........................................ 235/441; 235/482
(58) Field of Search .................................. 235/441, 482

(56) References Cited

U.S. PATENT DOCUMENTS 5,334,034 A      8/1994    Reichardt et al. ........... 439/188
6,086,425 A    *   7/2000    Lescoat ....................... 235/441

FOREIGN PATENT DOCUMENTS

DE          4003247         7/1991
GB          2322723         9/1998

* cited by examiner

*Primary Examiner*—Harold I. Pitts
(74) *Attorney, Agent, or Firm*—Blank Rome LLP

(57) ABSTRACT

The invention relates to a Smart Card reader. The inventive reader has a universal switch contained in a contact support. The universal switch contains two identical passive contact elements as well as an active contact element. By having two identical passive contact elements, an operator can choose between a close and an open final position without having to change to a completely different reader.

11 Claims, 3 Drawing Sheets

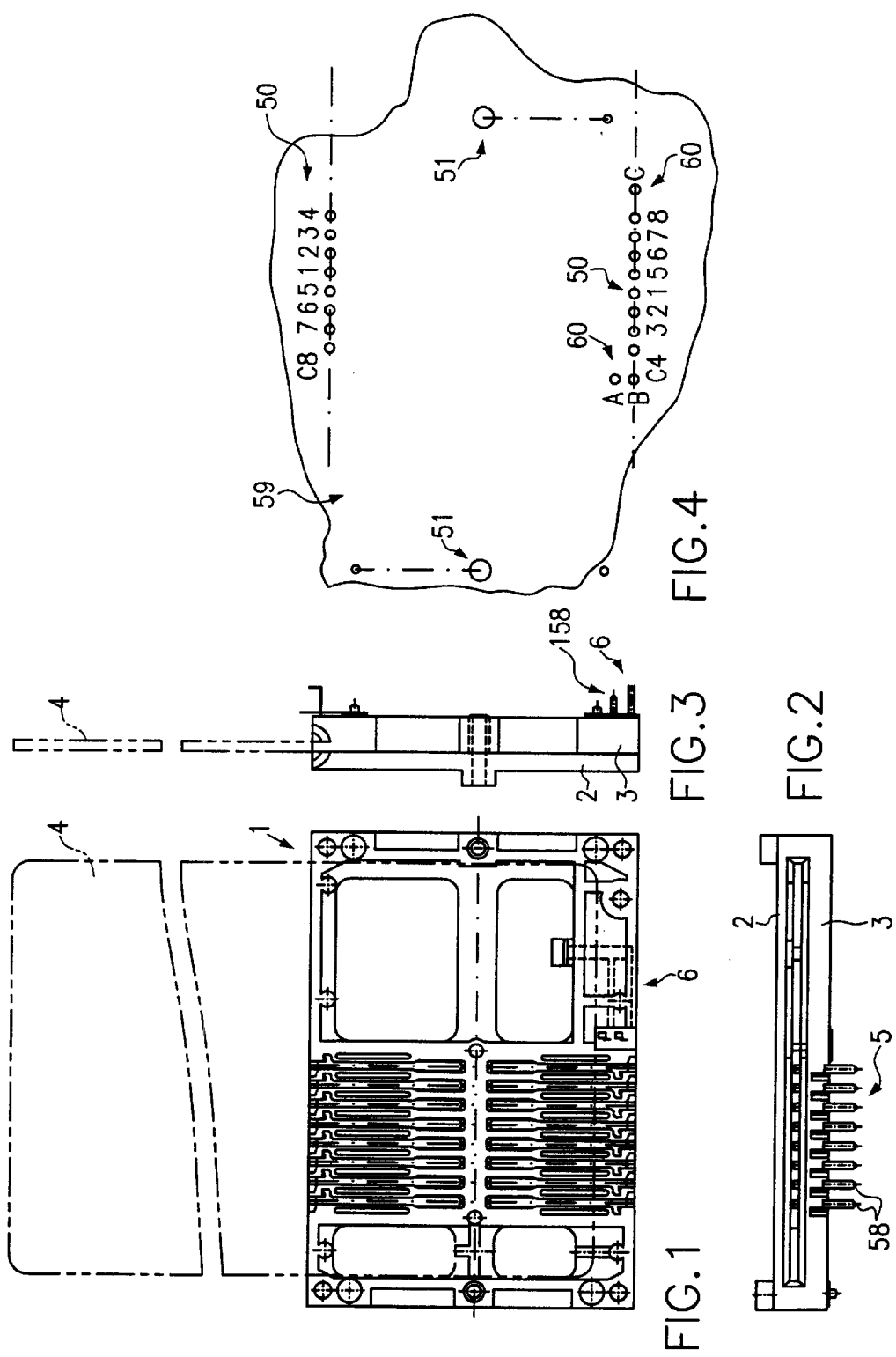

UNIVERSAL SWITCH FOR SMART CARD READER

BACKGROUND OF THE INVENTION

1. Field of the Invention

Figure 5:
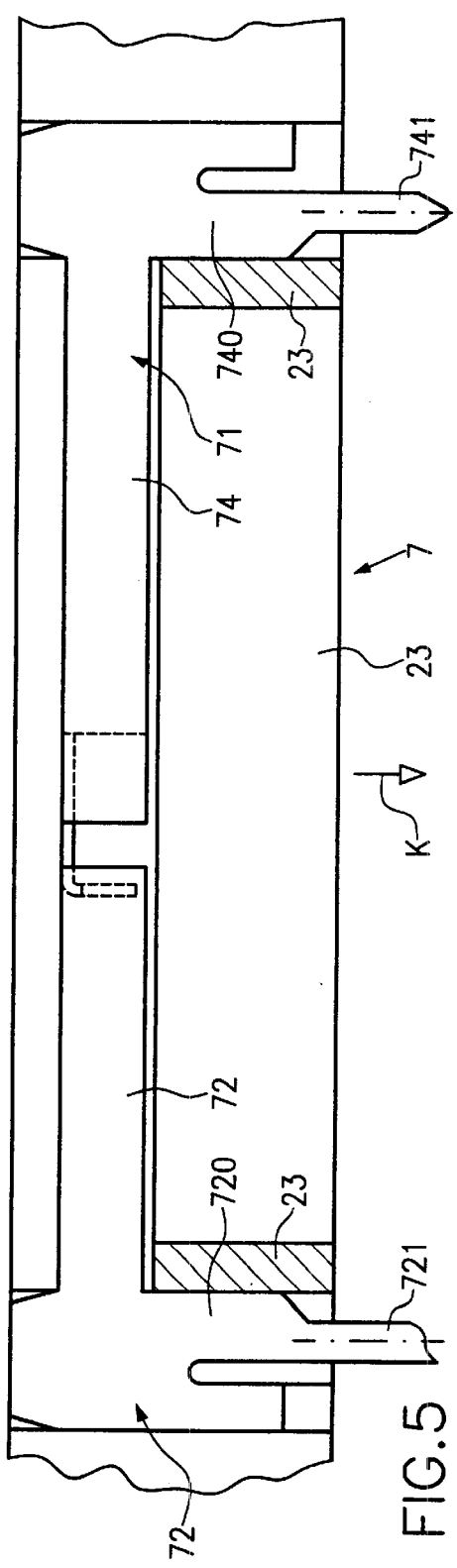

The invention relates to a universal switch for a Smart Card Connector or Smart Card Reader and in particular to one with solder contacts.

2. Description of Related Art

There exists already a vast number of Smart Card Connectors which frequently employ card final position switches, or briefly final position switches or simply switches which use contact elements of the leaf-spring type. The final position switches may be formed as so-called openers or as so-called closers, e.g. the switch opens and closes, respectively, if a card in its final position is present.

Generally, the terminal ends of the contact elements protruding from a Smard Card Connector, both of the reading contacts or reading contact elements (reading contact elements are such contact elements which are provided for a contacting engagement with contacts on the Smart or the chip card) and the switch contact elements forming the final position switch are disposed in particular positions. These positions of the terminal ends correspond to positions on a component, e.g. a printed circuit board on which the Smard Card Connector is to be used. These various positions are, for example, shown in FIG. 4 on sides of the component, e.g. a printed circuit board, for example, and are designated as C8 7651234 and as C4 3215678 for the terminal ends of the reading contact elements and as A, B and C for the terminal ends of the switch contact elements.

There are already known Smart Card Readers or Connectors in which the card final position switch is provided with its terminal ends of its switch contact elements at positions of terminals A and B as an opener or B and C as a closer.

SUMMARY OF THE INVENTION

It is an object of the invention to provide a card presence switch or a final position switch as a universal switch, in particular for a Smart Card Connector or a Smart Card Connector with universal switch such that the user has directly the possibility to choose between two switches in one Smart Card Connector.

In accordance with the invention the Smart Card Connector, for this purpose, is formed such that its final position switch performs both the function of a closer as well as that of an opener when operated by the Smart Card.

In accordance with the invention two preferably identical, passive contact elements as well as one active contact element are used.

From the construction in accordance with the invention there results a reduction of the number of available Smart Card Connector varieties which have to be on stock. The user himself is in the position to choose between final position switches formed as a LA opener or as a closer without having to exchange the Smart Card Connector.

Preferably, mounting of the final position switch into the cover of the Smart Card Connector is done from below. Therefore, opening of the cover is avoided.

In particular, two equal passive switch contact elements are located at positions A and B. At position C an active contact element, specifically in the shape of a contact spring is mounted. This contact spring forms together with position A an opener (NC=normally closed) and together with position B a closer (NO=normally open).

Additional advantages and objects of the invention follow from the description of embodiments with reference to the drawings.

DESCRIPTION OF THE FIGURES OF DRAWINGS

Figure 6:
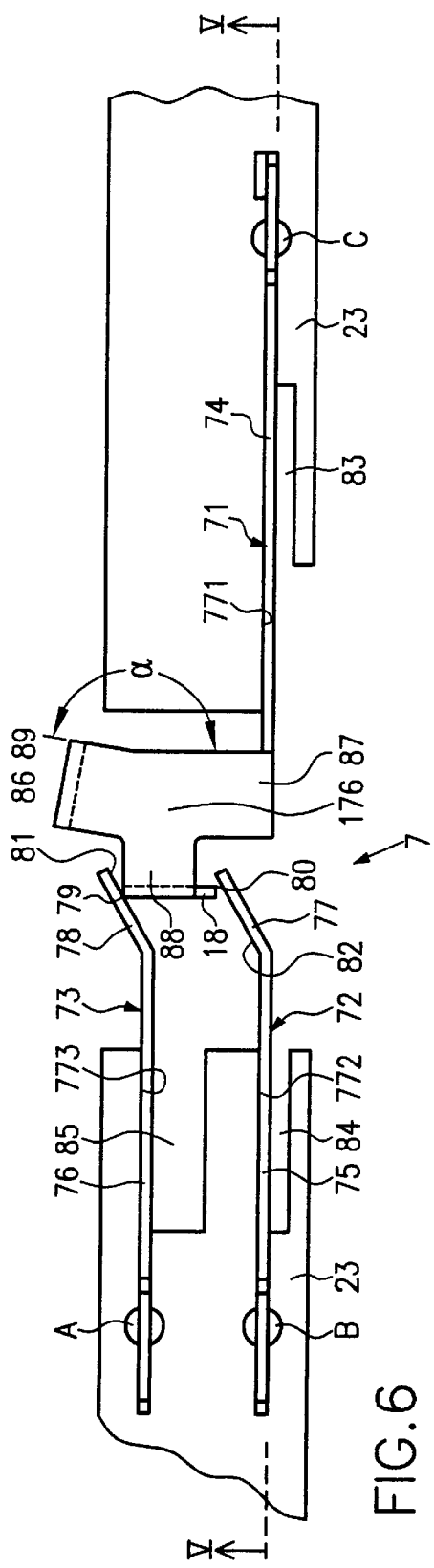
Figure 7:
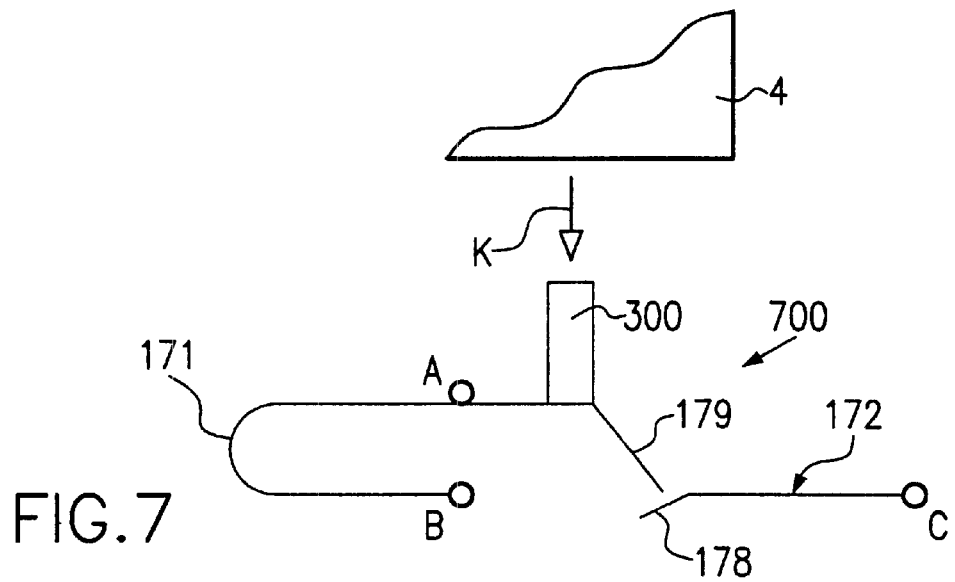
Figure 8:
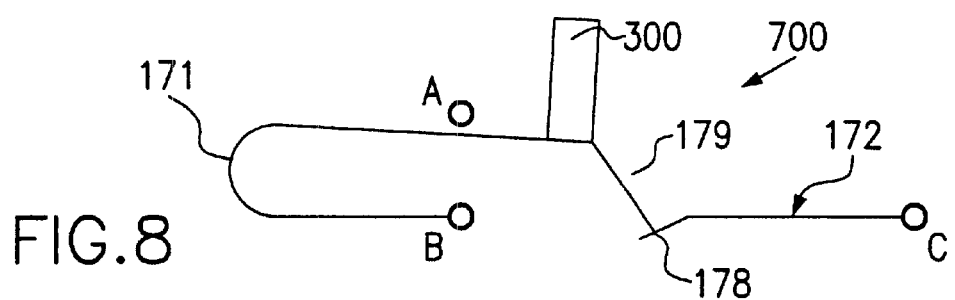

FIG. 1 a Smart Card Connector with a final position switch in a plan view of the bottom or lower side;

FIG. 2 a front view of the Connector of FIG. 1;

FIG. 3 a side view of the Connector of FIG. 1;

FIG. 4 a plan view of a circuit board onto which the Smart Card Connector of FIG. 1 may be soldered;

FIG. 5 a cross sectional view of a first embodiment of a final position switch in accordance with the invention wherein the illustrated section of FIG. 5 extends approximately along line V—V in FIG. 6;

FIG. 6 a plan view of the final position switch of FIG. 5;

FIG. 7 a schematic illustration of a second embodiment of the invention in an initial position in which no card in a final position is present; and FIG. 8 the schematic construction of FIG. 7 wherein the final position switch is activated by the card as it is present in its final position.

DETAILED DESCRIPTION OF THE PREFERRED EMBODIMENT

In FIGS. 1 to 3 a Smart Card Connector (also referred to as a chip card contacting apparatus or Smart Card or chip card reader) 1 is illustrated comprising a cover 2 which is connected to a contact support or frame 3. A Smart Card 4 or a chip card (abbr.: card) 4 may be inserted into the Smart Card Connector (also abbr.: reader) 1. Generally, contact elements 5 are mounted in the frame 3 and function to come in contact with card contacts provided on the card if the card 4 is present in its reading position. These contact elements 5 are also designated as reading contact elements 5. The reading contact elements 5 may be inserted with their terminal ends 58 shown in FIG. 2 into holes or openings generally provided at positions 50 (see FIG. 4) and soldered thereto.

A final position switch 6 operating as a universal switch— see FIGS. 1 and 3—is provided in the reader 1. The contact elements of the final position switch 6 are designated as switch contact elements and may be positioned with their terminal ends 158 (FIG. 3) in regions 60 (see FIG. 4) of a printed circuit board 59. These regions or positions 60 for the connection with the terminal ends 158 are designated in FIG. 4 in detail as A, B and C.

A first embodiment of the invention is illustrated in FIGS. 5 and 6. Here, a end position switch 7 is inserted into a contact support referenced 23, e.g. the switch contact elements 71, 72, 73 forming the final position switch 7 are inserted into the contact support 23. Said contact support may be formed either by the frame 3 or by the cover 2; which decision, for the moment, may be left open. Preferably, the contact support 23 is a corresponding component to the contact support 3 in FIGS. 1 to 3.

In the illustrated embodiment of FIGS. 5 and 6 the switch contact element 71 may be designated as an active switch element because it is actuatable by the card 4. If the card 4 is inserted in its reading position it applies a force K to the switch element 71. The switch contact elements 72, 73 may be designated correspondingly as passive switch contact elements. Preferably, the switch contact element 71 is biased against an abutment edge 771, and the preferably similar or identical formed switch contact elements 72, 73 are biased against the abutment edges 772 and 773 of the contact support.

Each of the switch contact elements 71, 72, 73 preferably has an arm 74, 75, 76, respectively. The arms 74 to 76 terminate in contact ends 176, 77, 78. The contact end 176 forms contact edges 79, 80, and the contact ends 77, 78 form contact inclinations or inclined contact portions 82 and 81, respectively. The contact support 23 forms spring spaces 83, 84 and 85 for the arms 74, 75 and 76. The contact element 71 has a card engagement surface 86 on its contact element end 176 which extends slightly oblique with respect to the longitudinal direction of the contact element arms in the not-actuated position as shown. This is achieved by an angle α larger than 180° which is provided between angle portions 87 and 89 of the contact element end 176. The contact element end 176 forms in addition to the angle portions 87, 89 a further angle portion 88 on which an arm 18 is provided which is inclined in the downward direction, as shown in FIG. 5.

The contact element 71, 72, 73 each have opposite to the arms 74, 75 and 76, respectively, (FIG. 5) portions 720, 740 extending perpendicular in a downward direction and which preferably are locked in the contact support 23 and which form on their free ends the terminal ends 721, 741 of the switch contact elements 71, 72 and 73.

As indicated in FIG. 6, the terminal ends 721 and 741 may be connected to the regions B and C (see also FIG. 4) to form an final position switch functioning as a closer. By connecting the terminal of the contact element 73 being located in FIG. 5 behind the terminal end 721 with region A and by connecting the terminal end 741 with region 741 an opener may be realized.

FIGS. 7 and 8 show a second embodiment of the invention in a schematic illustration. Here, two switch contact elements 171, 172 which are preferably formed like a leaf spring and forming the final position switch 700 are supported in a contact support (not shown). The contact element 171 is bent in a U-shape and is always connected or in communication with position B, it may however be lifted from position A if the card 4 strikes or reaches in the direction of the arrow K a card contact part 300 of the contact element 171. The contact element 172 is preferably formed like a leaf-spring and has an inclined or oblique contact element end 178 which may be preferably contacted by the inclined end 179 of the contact element 171, as is illustrated in FIG. 8. Also, thereby there is provided a final position switch 700 effective as an opener and a closer by using two contact elements 171, 172. This means, if the card 4 has reached its reading position there are a) the positions A and B open, hence, forming an "opener", and b) the positions B and C closed, hence, forming a "closer". Depending on where (at positions AB or BC) the user forms the connections he obtains an opener or a closer.

What is claimed is:

1. A Smart Card reader comprising a contact support and a universal switch, said universal switch having two passive switch contact elements and one active switch contact element, wherein, upon actuation by a Smart Card, said universal switch performs a contact opening and a contact closing operation, and wherein said switch contact elements are inserted into said contact support.

2. The Smart Card reader of claim 1, wherein said passive switch contact elements are identically formed.

3. The Smart Card reader of claim 1, wherein a switch contact element is provided which comprises two terminal ends, said switch contact element is movable away from one terminal end upon actuation by said card and thus performing an opening function, while simultaneously a closing function may be performed together with a further contact element.

4. The Smart Card reader of claim 1, wherein each of said switch contact elements comprises an arm having contact ends.

5. The Smart Card reader of claim 4, wherein a contact end forms a contact edge, and another contact end forms contact inclinations or inclined contact portions.

6. The Smart Card reader of claim 1, wherein a contact support forms spring spaces for said switch contact elements.

7. The Smart Card reader of claim 1, wherein said contact element forms at its contact end a card engagement surface which extends slightly obliquely with respect to the longitudinal extent of the contact element arm.

8. The Smart Card reader of claim 1, wherein in between angle portions of said contact element end an angle $\alpha < 180°$ is provided.

9. The Smart Card reader of claim 1, wherein said contact element end forms in addition to said angle portions a further angle portion at an arm being angled in a downward direction.

10. The Smart Card reader of claim 1, wherein said contact elements each form opposite said arms portions extending perpendicular in a downward direction, said portions lock in said contact support and form said terminal ends at their free ends.

11. The Smart Card reader of claim 1, wherein said switch contact elements each being biased against abutment edges.

\* \* \* \* \*